(12) United States Patent
Dewert

(10) Patent No.: US 11,571,073 B2
(45) Date of Patent: Feb. 7, 2023

(54) ELECTRIC MOTOR ADJUSTABLE SUPPORT DEVICE

(71) Applicant: de Werth Group AG

(72) Inventor: Eckhart Dewert, Goldingen (CH)

(73) Assignee: de Werth Group AG, Zürich (CH)

( * ) Notice: Subject to any disclaimer, the term of this patent is extended or adjusted under 35 U.S.C. 154(b) by 2 days.

(21) Appl. No.: 17/387,627

(22) Filed: Jul. 28, 2021

(65) Prior Publication Data

US 2022/0047087 A1    Feb. 17, 2022

(30) Foreign Application Priority Data

Aug. 12, 2020 (DE) ................. 20 2020 104 670.5
Apr. 1, 2021 (DE) ................. 10 2021 108 368.0
Apr. 1, 2021 (DE) ................. 20 2021 101 760.0

(51) Int. Cl.
*A47C 20/04* (2006.01)
*H02K 7/06* (2006.01)

(52) U.S. Cl.
CPC .......... *A47C 20/041* (2013.01); *A47C 20/042* (2013.01); *H02K 7/06* (2013.01)

(58) Field of Classification Search
CPC ....... A47C 20/041; A47C 20/042; H02K 7/06
See application file for complete search history.

(56) References Cited

U.S. PATENT DOCUMENTS

| | | | | |
|---|---|---|---|---|
| 3,447,170 A | * | 6/1969 | Spitz | A47C 23/005 297/452.17 |
| 4,381,571 A | * | 5/1983 | Elliott | A61G 7/015 5/616 |
| 5,528,948 A | | 6/1996 | De Gelis | |
| 5,542,744 A | * | 8/1996 | Bathrick | A47C 20/041 74/89.41 |
| 5,640,730 A | * | 6/1997 | Godette | A47C 20/041 5/617 |
| 5,675,849 A | * | 10/1997 | Koch | A47C 20/041 5/616 |
| 5,829,077 A | * | 11/1998 | Neige | A47C 20/041 5/616 |

(Continued)

FOREIGN PATENT DOCUMENTS

DE    38 42 078        7/1989
DE    100 46 751 A1    7/2001

(Continued)

OTHER PUBLICATIONS

EPO (European Patent Office) Search Report in EP21189386.2, Report dated Jan. 17, 2022 (8 pages).

*Primary Examiner* — David M Fenstermacher
(74) *Attorney, Agent, or Firm* — Shlesinger, Arkwright & Garvey LLP

(57) ABSTRACT

An electric motor adjustable support device for supporting padding of seating and/or lounging furniture. In particular, padding of seating and/or lounging furniture, such as the mattress of a bed. The support device has a base part and a support part that is connected to the base part, so as to be swivelable about a first swivel axis. In the region of the first swivel axis, at least one first wedge-like lifting guide element is situated at the base part. Further, at least one second wedge-like lifting guide element, opposite from the first wedge-like lifting guide element, is situated at the support part.

6 Claims, 9 Drawing Sheets

(56) References Cited

U.S. PATENT DOCUMENTS

| | | | |
|---|---|---|---|
| 6,742,205 B2 | 6/2004 | Dewert | |
| 6,754,922 B2 | 6/2004 | Dewert | |
| 6,961,971 B2 | 11/2005 | Schneider et al. | |
| 7,198,325 B2 | 4/2007 | Dewert | |
| 7,386,901 B2 | 6/2008 | Dewert | |
| 7,404,603 B2 | 7/2008 | Dewert | |
| 7,484,257 B2 | 2/2009 | Schneider et al. | |
| 7,861,610 B2 | 1/2011 | Dewert | |
| 8,479,332 B2 | 7/2013 | Dewert et al. | |
| 8,973,185 B2 | 3/2015 | Dewert | |
| 9,590,465 B2 * | 3/2017 | Marcantoni | A47C 20/041 |
| 9,877,589 B2 | 1/2018 | Dewert | |
| 9,980,575 B2 | 5/2018 | Dewert et al. | |
| 10,010,464 B2 | 7/2018 | Dewert | |
| 10,292,882 B2 * | 5/2019 | Bellingroth | A61G 7/018 |
| 10,463,162 B2 | 11/2019 | Dewert | |
| 10,477,977 B2 | 11/2019 | Dewert | |
| 10,624,463 B2 * | 4/2020 | Rawls-Meehan | A47C 20/041 |
| RE48,008 E * | 5/2020 | Mossbeck | A61G 7/018 |
| 11,172,766 B2 * | 11/2021 | Schneider | A47C 23/067 |
| 2003/0052238 A1 | 3/2003 | Schneider et al. | |
| 2003/0079290 A1 * | 5/2003 | Dewert | A47C 20/041 5/618 |
| 2003/0172756 A1 | 9/2003 | Dewert | |
| 2004/0020316 A1 | 2/2004 | Dewert | |
| 2008/0121852 A1 | 5/2008 | Koch | |
| 2015/0074908 A1 | 3/2015 | Dewert | |
| 2016/0015583 A1 * | 1/2016 | Dewert | A61G 7/015 5/616 |
| 2016/0157623 A1 | 6/2016 | Dewert | |
| 2017/0332798 A1 | 11/2017 | Dewert | |

FOREIGN PATENT DOCUMENTS

| | | |
|---|---|---|
| DE | 100 46 750 C1 | 4/2002 |
| DE | 20 2004 020 384 U1 | 6/2005 |
| EP | 0 372 032 | 11/1989 |
| EP | 3 009 052 | 4/2016 |
| EP | 3 009 052 A1 | 4/2016 |
| WO | WO 89/10715 | 11/1989 |

* cited by examiner

ELECTRIC MOTOR ADJUSTABLE SUPPORT DEVICE

The invention relates to an electric motor-driven adjustable support device of the type for supporting padding of seating and/or lounging furniture, in particular a mattress of a bed.

BACKGROUND OF THE INVENTION

These types of support devices in the form of slatted frames, for example, are generally known.

An electric motor-driven adjustable support device of the type in question is known from EP 3 009 052 A2, having a base part, and a support part that is connected to the base part so as to be swivelable about a first swivel axis. The support device also includes an electric motor-driven drive device that is in operative connection with the base part and the support part in order to adjust the swiveling of the support part relative to the base part, the base part and the support part being designed and operatively connected to the drive device in such a way that the support part is adjustable between an unadjusted starting position, in which the support part lies flat on the base part, and an end position of the adjustment movement in which the support part is situated at an angle relative to the base part. The support device known from the cited publication is designed as a retrofit kit, by means of which a nonmotorized support device may be retrofitted with the functionality of an electric motor-driven adjustment. For this purpose, the retrofit kit is inserted, for example, in the region of a head part of a slatted frame, between the slatted frame and the mattress. By electric motor-driven adjustment of the support part relative to the base part of the retrofit kit, the mattress may then be adjusted by electric motor in the region of the head part of the slatted frame, so that the slatted frame is retrofitted with the functionality of an electric motor-driven adjustment.

OBJECTS OF THE INVENTION

The object of the invention is to provide a support device, which is improved over the support device, designed as a retrofit kit, known from the cited publication.

This object is achieved by the invention set forth herein.

The invention provides that the electric motor-driven drive device has a spindle drive that includes a stationary, rotatably supported threaded spindle that is in rotary drive connection with an electric motor of the drive device, and on which a spindle nut, which is movable in the axial direction of the threaded spindle and which forms the output element of the electric motor-driven drive device, is situated, at least one first wedge-like lifting guide element being situated at the base part in the region of the swivel axis, and at least one second wedge-like lifting guide element, opposite from the first wedge-like lifting guide element, being situated at the support part, and the lifting guide elements being situated in the movement path of a free end of a tappet, the other end of the tappet being articulatedly connected to the spindle nut and swivelable about a second swivel axis that is parallel to the first swivel axis, so that the free end of the tappet presses against the lifting guide elements in order to swivel the support part relative to the base part.

The invention provides a support device that has a simple and robust design, and that allows an adjustment even under high load. This is achieved according to the invention in that with regard to the interaction of the tappet with the lifting guide elements, the invention makes use of the principle of a wedge.

One particular advantage of the support device according to the invention is that it has a particularly low installation height.

The support device according to the invention may therefore also be used in particular for retrofitting a nonmotorized support device, for example in the form of a slatted frame, with the functionality of an electric motor-driven adjustment.

The support device according to the invention may be used with any desired seating and/or lounging furniture or other furniture, for example and in particular beds or similar lounging furniture, as well as armchairs. For an armchair, a support device according to the invention may be used for example and in particular as a standing assist. For this purpose, a support device according to the invention is placed on a seating surface of an armchair, so that the top side of the support part is the support device, optionally using padding, for example a cushion, placed on top, which then forms the seating surface of the armchair. By adjusting the support part relative to the base part, the seating surface thus formed may be inclined, thereby assisting a user in standing up. In such a case, the size of the surface area of the support device is adapted to the size of the seating surface of the armchair, so that the support device fits into the armchair in a functionally advantageous and visually appealing manner. Such a use of a support device according to the invention has inventive content on its own.

The support device according to the invention is particularly suitable for temporarily or permanently retrofitting hospital or care beds with the functionality of an electric motor-driven adjustment.

In addition, the support device according to the invention is also well suited, for example, for retrofitting hotel beds, in particular temporarily, with the functionality of an electric motor-driven adjustment.

The shape, size, and design of the or each lifting guide element are selectable within wide limits, depending on the particular requirements and circumstances. In this regard, one further embodiment of the invention provides that each lifting guide element has an expanding cross section, at least in portions, from its end facing away from the first swivel axis toward its end facing the first swivel axis. The kinematics of the adjustment movement resulting from a linear motion of the tappet are a function of the particular design of the shape of the lifting guide elements.

In principle, at least one of the lifting guide elements may be designed as a wedge. However, one advantageous further embodiment of the invention provides that at least one lifting guide element has a contact surface having a cross section that is arch-shaped, at least in portions, for the free end of the tappet. By appropriately choosing the curve pattern of the arch, in particular the force-displacement characteristic for the adjustment is selectable in the design of the support device.

Another advantageous further embodiment of the invention provides that two first lifting guide elements, spaced apart from one another in the radial direction of the threaded spindle, are situated at the base part, the distance of the lifting guide elements from one another being selected in such a way that the tappet is guided between the lifting guide elements in the region of the end position of the adjustment movement.

To reduce the friction in the interaction of the free end of the tappet with the lifting guide elements, another advantageous further embodiment of the invention provides that at least one rotatably supported roller for resting against a contact surface of a lifting guide element is situated at the free end of the tappet.

A further embodiment of the above-mentioned embodiment provides that two rollers, spaced apart from one another in the radial direction of the threaded spindle, for resting against the first lifting guide elements of the base part are situated at the free end of the tappet, and a further roller for resting against the second lifting guide element of the support part is situated between the two rollers.

The subject matter of the invention and the disclosed content of the present patent application also include embodiments in which a single wedge-like lifting guide element is used, which is situated at the base part or the support part, and which is in operative connection with a movable, in particular linear movable, adjustment element situated at the other part in such a way that when the adjustment element moves, the support part is swiveled relative to the base part, in particular by contact of the adjustment element, or a component connected to it, with the lifting guide element.

The invention is explained in greater detail below based on one embodiment, with reference to the appended drawings. All features described in the description, illustrated in the drawings, and claimed in the claims, alone or in any arbitrary combination, constitute the subject matter of the invention, regardless of their recapitulation in the claims or their back-reference, and regardless of their wording or illustration in the description or drawings, respectively.

DETAILED DESCRIPTION OF THE INVENTION

One embodiment of an electric motor-driven adjustable support device according to the invention for supporting padding of seating and/or lounging furniture is explained in greater detail below with reference to FIGS. 1 through 9. Components are omitted in some figures for reasons of illustration. The omitted components should be conceptually added in a corresponding manner in the figures in question.

Figure 1:
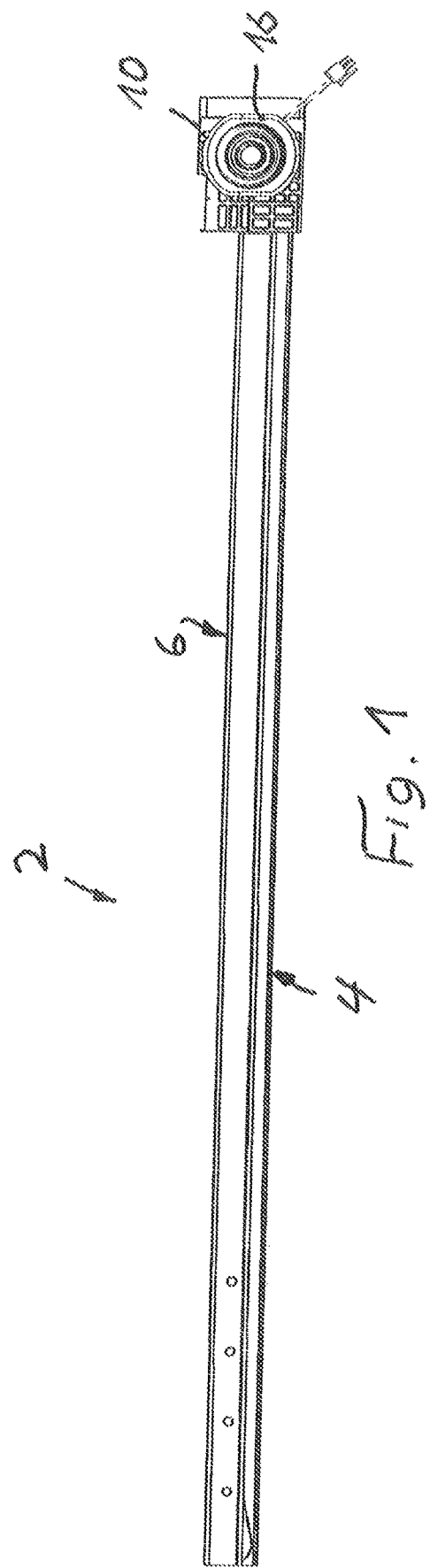
FIG. 1 shows a side view of one embodiment of a support device according to the invention in an unadjusted starting position.
Figure 2:
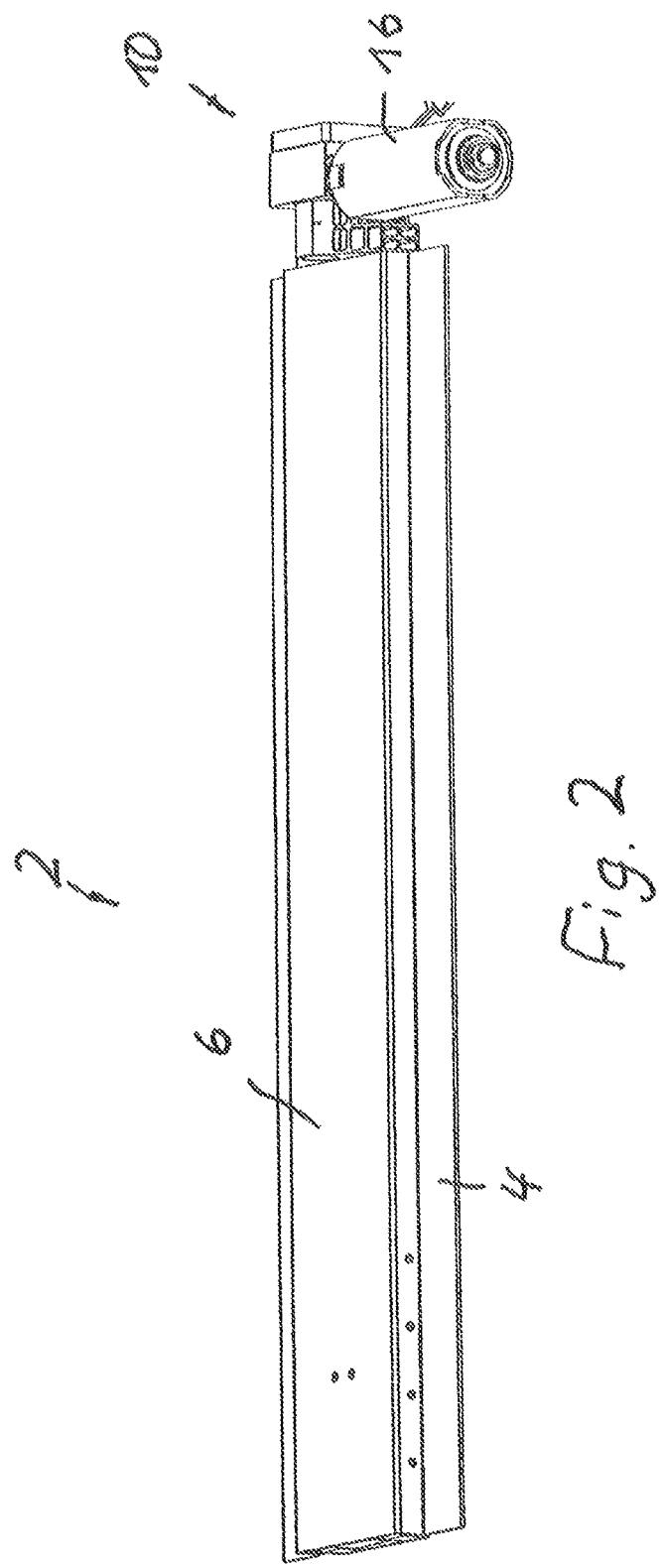
FIG. 2 shows a perspective view of the support device according to FIG. 1 in the unadjusted starting position.
Figure 3:
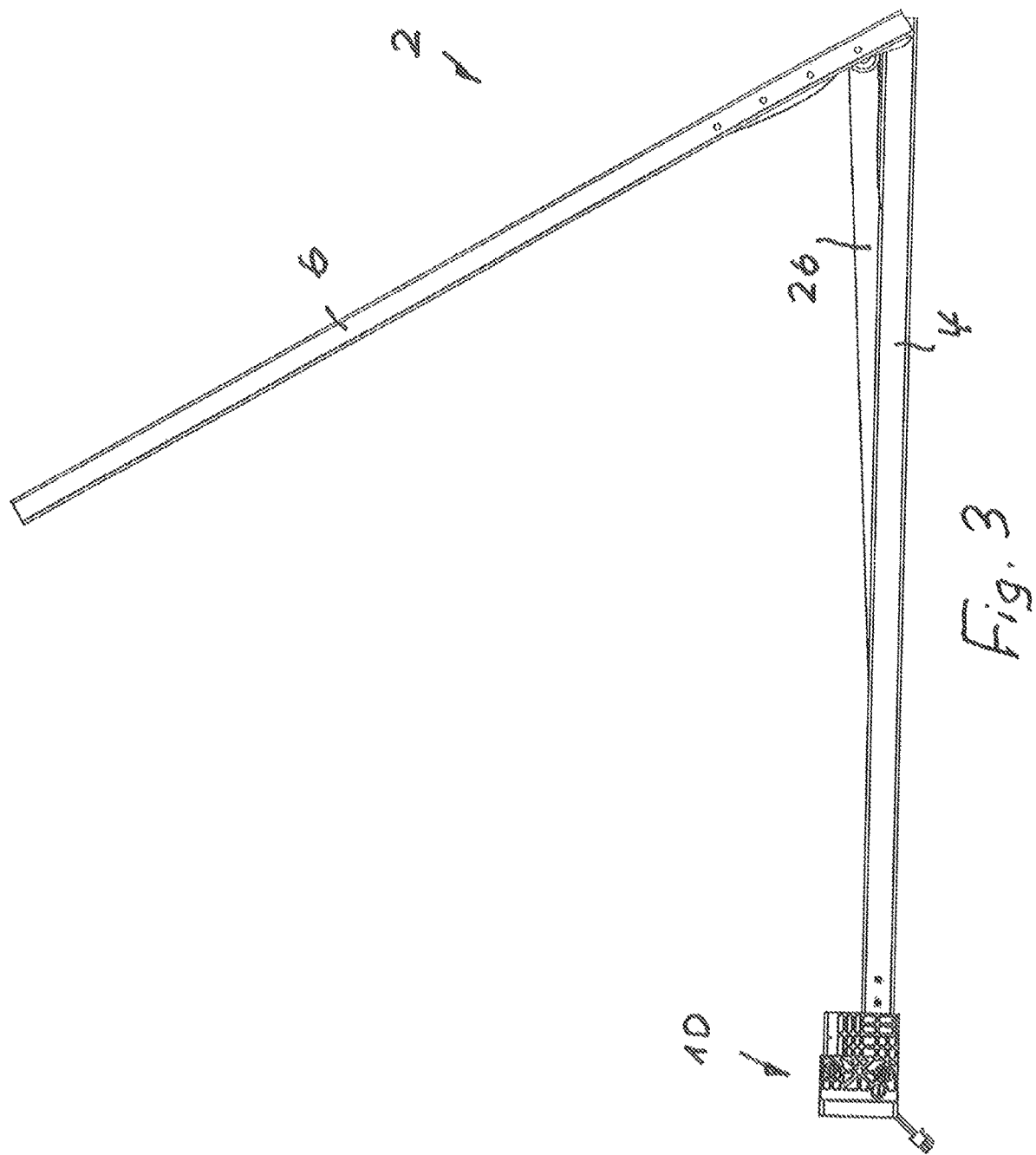
FIG. 3 shows, in the same illustration as FIG. 1, the support device according to FIG. 1 in the end position of the adjustment movement.
Figure 4:
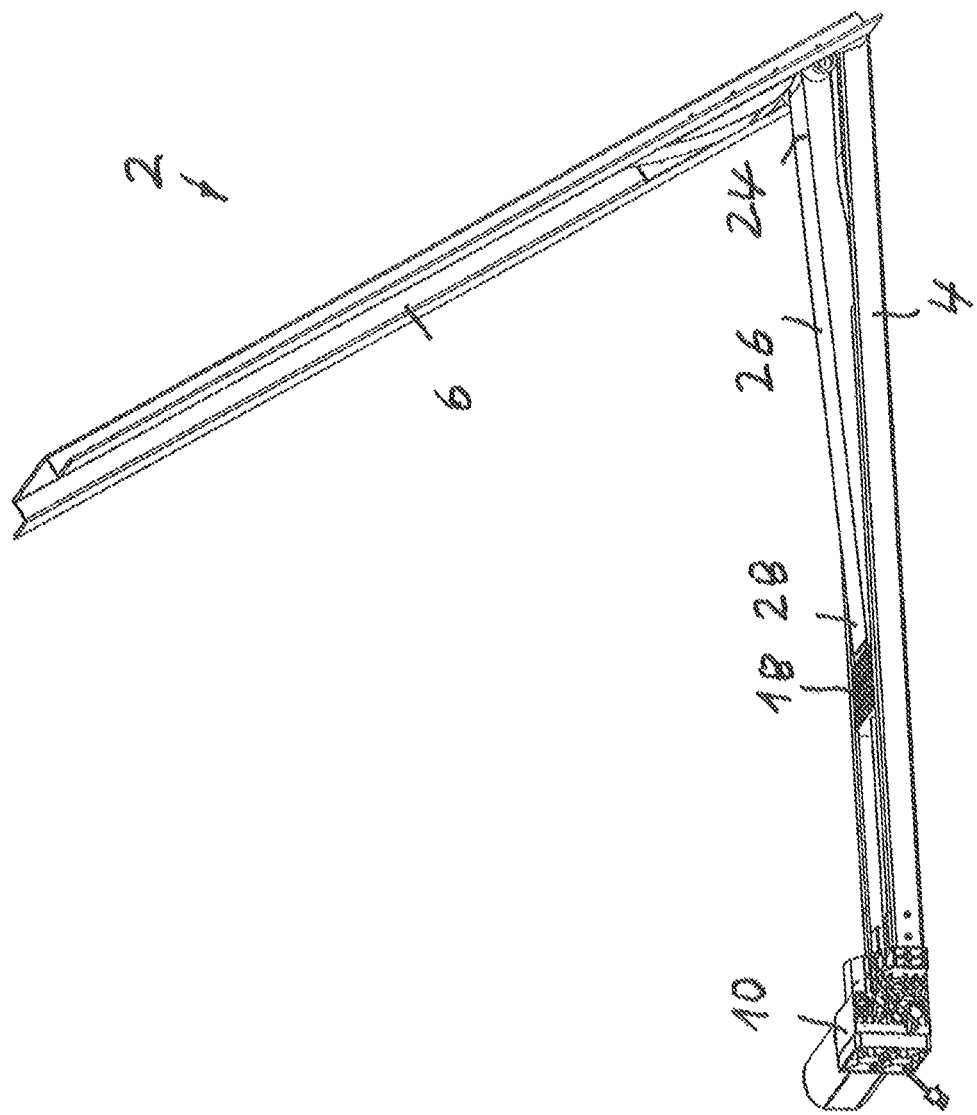
FIG. 4 shows, in the same illustration as FIG. 2, the support device according to FIG. 1 in the end position of the adjustment movement.

In the drawings, FIGS. 1 and 2 show a side view and a perspective view, respectively, of one embodiment of an electric motor-driven adjustable support device 2 according to the invention in the unadjusted starting position, while FIGS. 3 and 4 show the support device 2 in a side view and a perspective view, respectively, in the end position of the adjustment movement.

Figure 5:
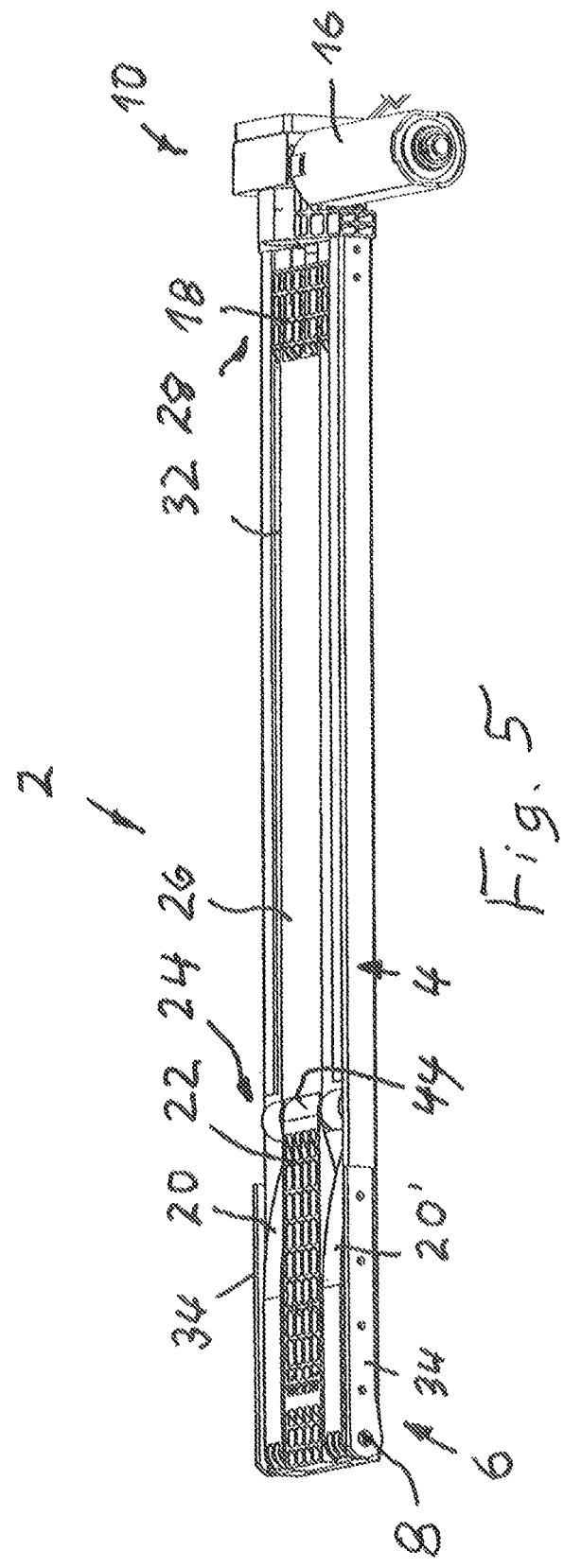
FIG. 5 shows, in the same illustration as FIG. 2, the support device according to FIG. 2 with a support surface part of the support part omitted.
Figure 8:
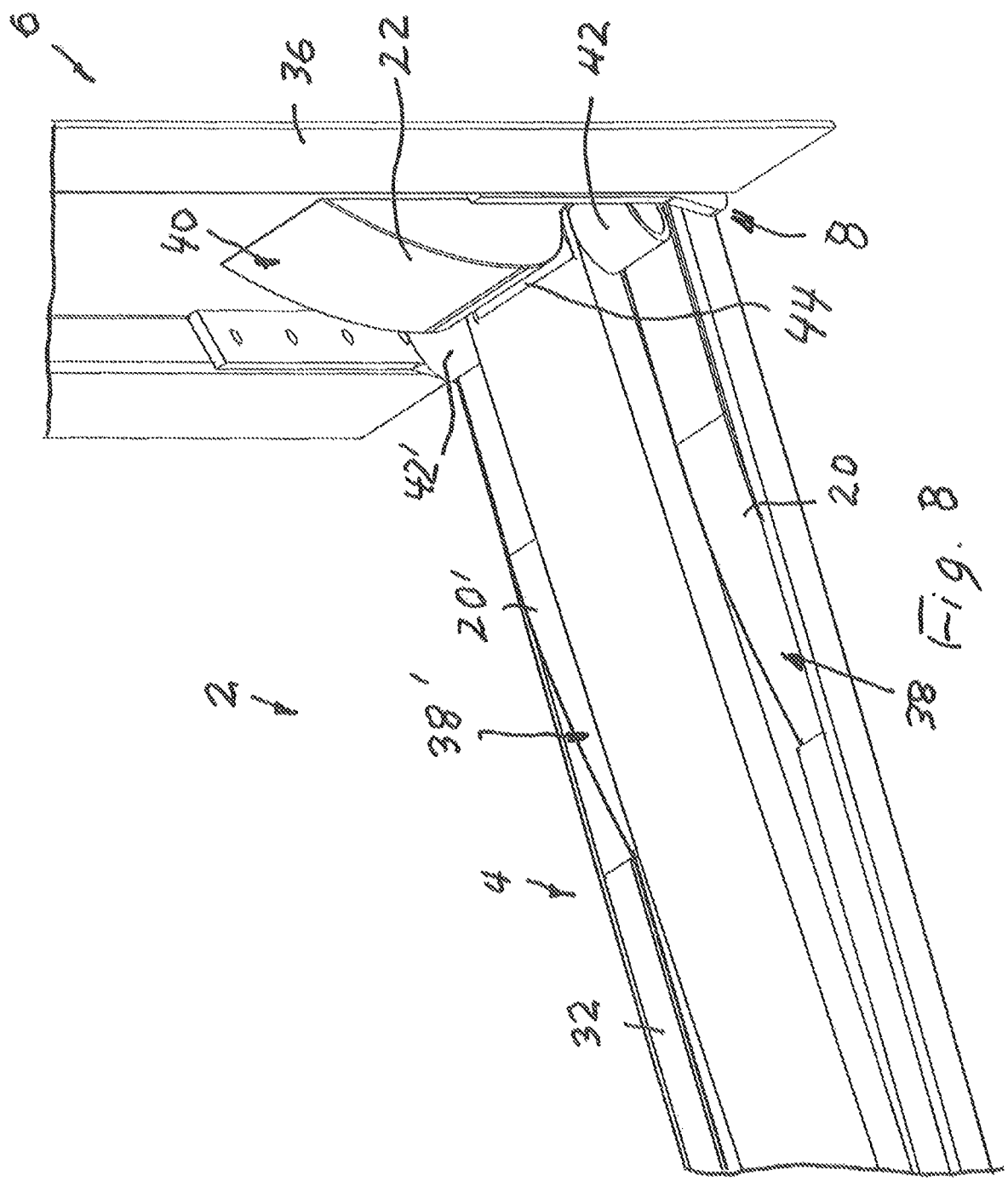
FIG. 8 shows, in the same illustration as FIG. 7 but in enlarged scale compared to FIG. 7, a detail of the support device according to FIG. 7 between the base part and the support part in the region of the swivel axis.

The support device 2 has a base part 4, and a support part 6 that is connected to the base part 4 so as to be swivelable about a first swivel axis 8 (see FIGS. 5 and 8). The support device 2 also has an electric motor-driven drive device 10, explained in greater detail below with reference to FIG. 9. The base part 4 and the support part 6 have approximately the same surface area.

The base part 4 and the support part 6 are designed and operatively connected to the drive device 10 in such a way that the support part lies flat on the base part 4 in the unadjusted starting position (see FIGS. 1 and 2), and is situated at an angle relative to the base part 4 in an end position of the adjustment movement (see FIGS. 3 and 4).

The electric motor-driven drive device 10 has a spindle drive 12 (see FIGS. 6 and 9) with a stationary, rotatably supported threaded spindle 14 that is in rotary drive connection with an electric motor 16 of the drive device 10, and on which the spindle nut 18, which is movable in the axial direction of the threaded spindle 14 and which forms the output element of the electric motor-driven drive device 10, is situated.

According to the invention, situated in the region of the first swivel axis 8 are at least one first wedge-like lifting guide element 20 at the base part 4, and at least one second wedge-like lifting guide element 22, opposite from the first wedge-like lifting guide element, at the support part 6.

According to the invention, the lifting guide elements 20, 22 are situated in the movement path of a free end 24 of a tappet 26 (see FIGS. 5 and 6), the other end 28 of the tappet being articulatedly connected to the spindle nut 18 so as to be swivelable about a second swivel axis 30 that is parallel to the first swivel axis 8 (see FIG. 7), so that the free end 24 of the tappet presses against the lifting guide elements 20, 22 in order to swivel the support part 6 relative to the base part 4.

The base part 4 has a base body which is formed by a profile rail 32 made of metal, and which forms a linear guide that extends in the axial direction of the threaded spindle 14, and in which the spindle nut 18 is nonrotatably guided.

Figure 6:
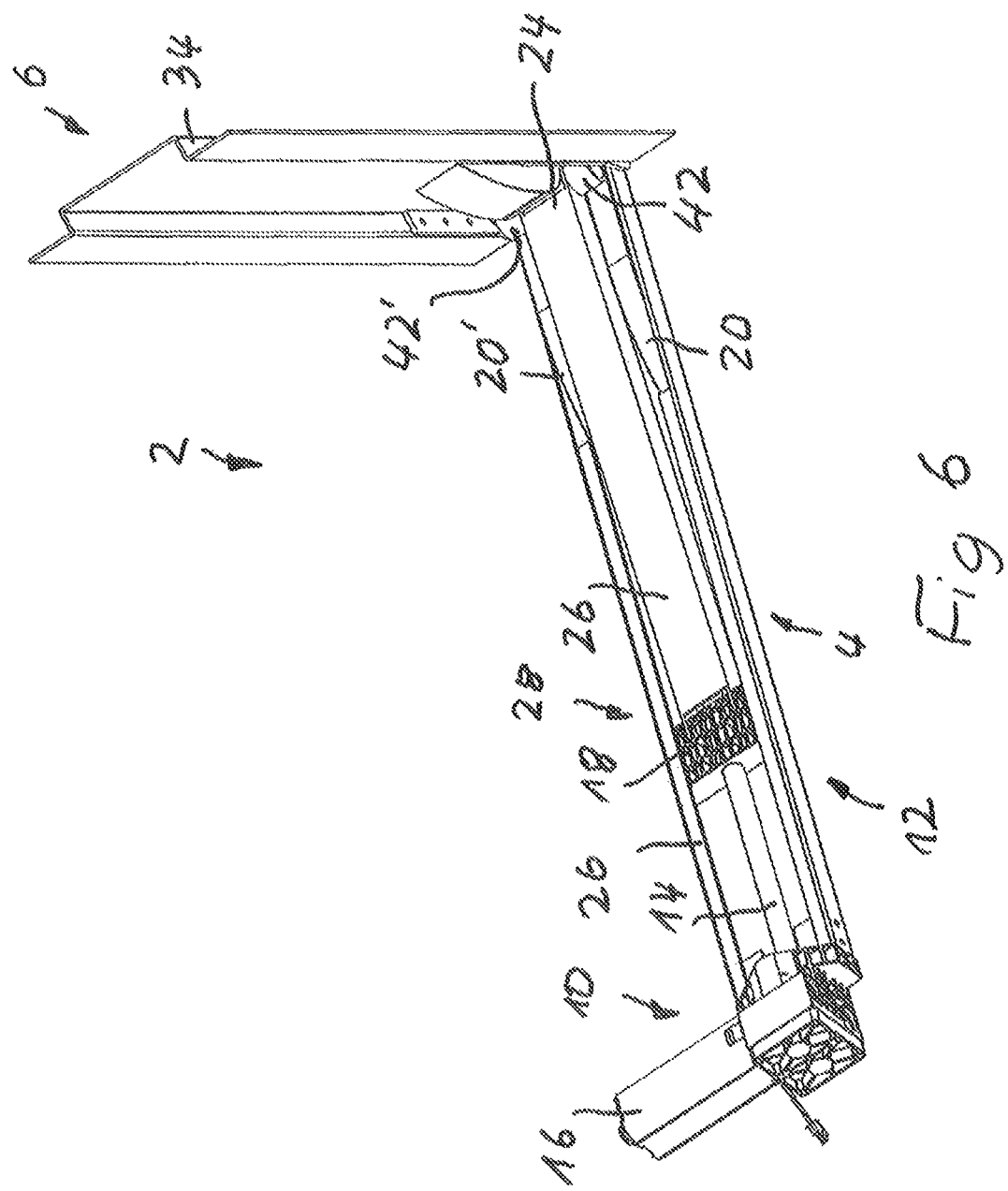
FIG. 6 shows, in an illustration similar to FIG. 4, the support device according to FIG. 4 with a support surface part of the support part omitted.

FIG. 6 shows the support device 2 in the end position of the adjustment movement. The support part 6 is made up of a retaining part 34 and a support surface part 36, the latter being omitted in FIG. 6 and the subsequent figures in order to simplify the illustration.

Figure 7:
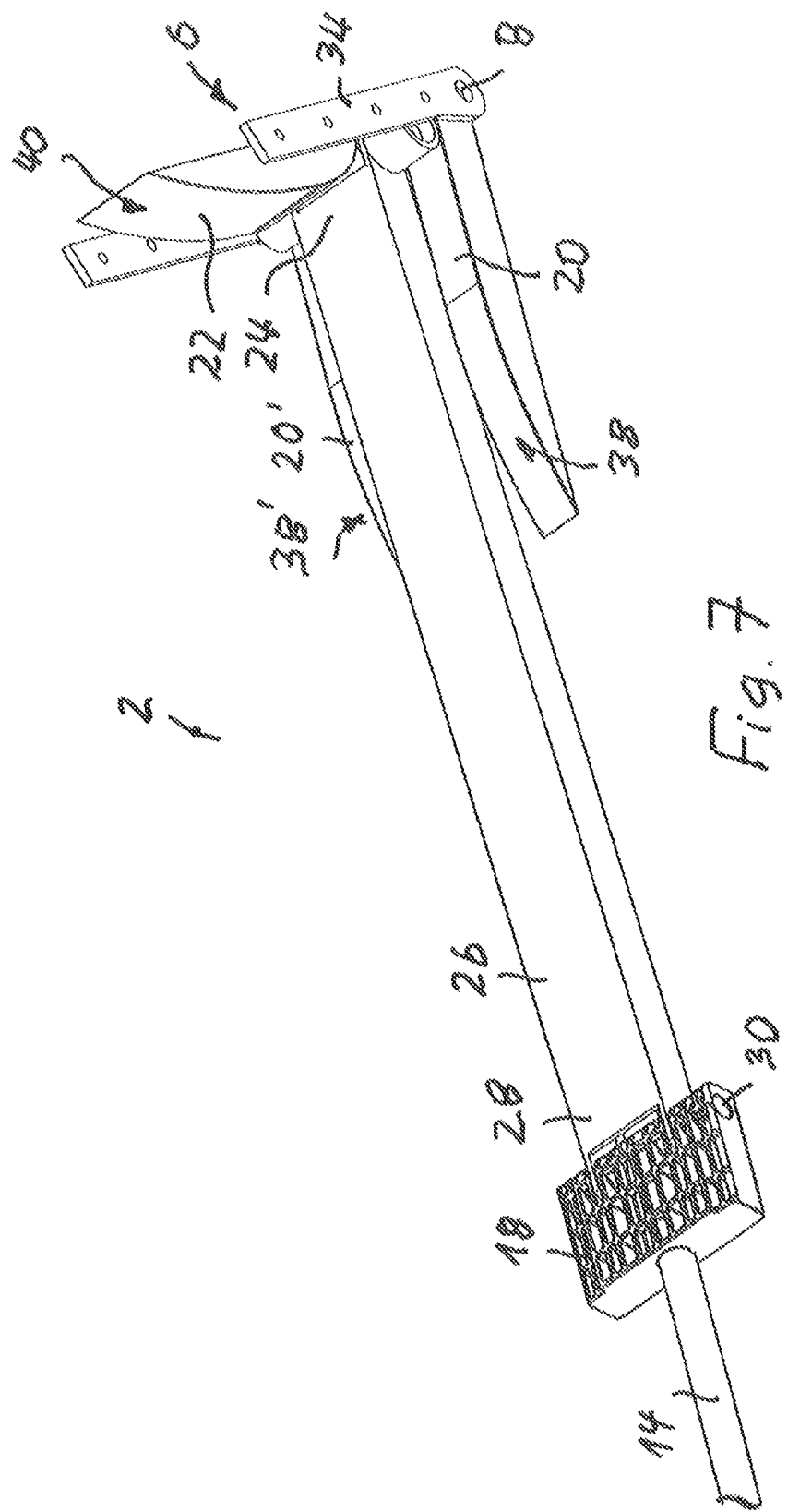
FIG. 7 shows, in the same illustration as FIG. 6 but in enlarged scale compared to FIG. 6, a detail of the support device according to FIG. 6 with the base body of the base part omitted.

FIGS. 7 and 8 each show a detail from FIG. 6 in the region of the first swivel axis 8, the profile rail 32 being omitted in FIG. 7 for reasons of clarity.

It is apparent in particular from FIG. 7 that in the illustrated embodiment, two first lifting guide elements 20, 20', spaced apart from one another in the radial direction of the threaded spindle 14, are situated at the base part 4, the distance between the lifting guide elements 20, 20' being selected in such a way that the tappet is accommodated between the first lifting guide elements 20, 20' in the region of the end position of the adjustment movement.

It is also apparent in particular from FIG. 7 that each lifting guide element 20, 20', 22 has an expanding cross section, at least in portions, from its end facing away from the first swivel axis 8 toward its end facing the first swivel axis 8, and that each lifting guide element 20, 20', 22 has a contact surface 38, 38', 40, respectively, having a cross section that is arch-shaped, at least in portions, for the free end of the tappet 26.

The shape of the contact surfaces 38, 38' and 40 determines the kinematics via which the support part 6 is moved during a movement of the spindle nut 18 along the threaded spindle 14.

Two rollers 42, 42', spaced apart from one another in the radial direction of the threaded spindle, for resting against the first lifting guide elements 20, 20' of the base part are situated at the free end of the tappet, and a further roller 44 for resting against the second lifting guide element 22 of the support parts 6 is situated between the two rollers.

Figure 9:
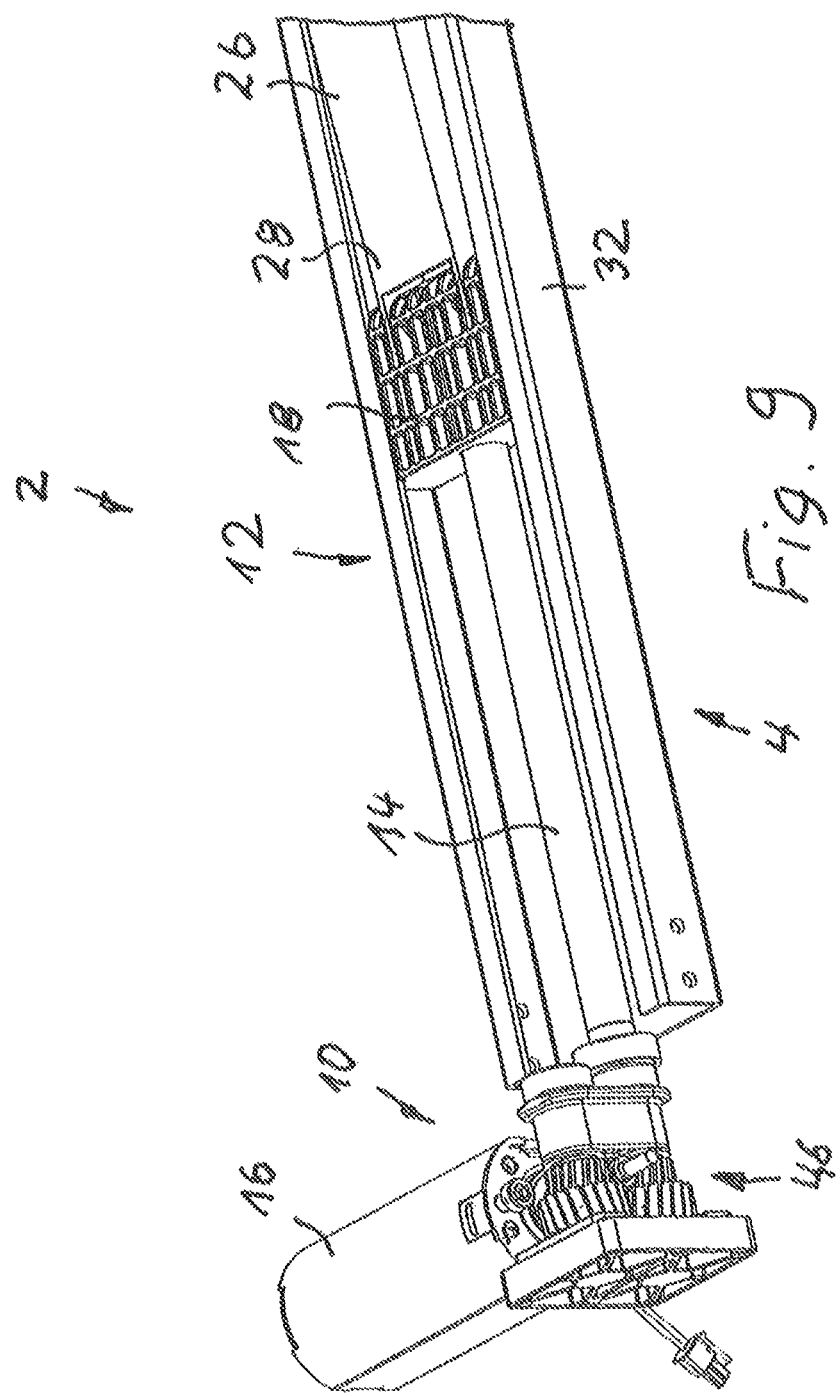
FIG. 9 shows, in the same illustration as FIG. 6 but in enlarged scale compared to FIG. 6, a detail of the support device according to FIG. 6 in the region of an electric motor-driven drive device.

FIG. 9 shows a detail from FIG. 4 in the region of the electric motor-driven drive device 10, the electric motor 16 of which is in rotary drive connection with the threaded spindle 14 via a worm gear 46, whose gear housing is omitted in FIG. 9 for reasons of clarity, so that the spindle nut 18 moves to the right in FIG. 9 (corresponding to a movement of the support part 6 from the unadjusted starting position in the direction of the end position of the adjustment movement) or to the left (corresponding to a return of the support part 6 from the end position or some other position of the adjustment movement back to the starting position of the adjustment movement), depending on the rotational direction of the output shaft of the electric motor 16, and thus, the rotational direction of the threaded spindle 14.

The design of such an electric motor-driven drive device, including power supply and control means, is generally known to those skilled in the art, and therefore is not explained in greater detail here.

Spring elements, for example in the form of elastic slats made of plastic or bed frames that are situated at the support part 6, are not illustrated in the drawings in order to simplify the illustration: The design of such spring elements is likewise known to those skilled in the art, and therefore is not explained in greater detail here.

The operating principle of the support device 2 according to the invention is as follows:

In the unadjusted starting position, the spindle nut 18 is situated at the end of the threaded spindle 14 facing the electric motor-driven drive device 10, as is apparent from FIG. 5, for example. In this position, the free end of the tappet 26 is disengaged from the lifting guide elements 20, 20' and 22.

Starting from this starting position, the electric motor 16 drives the threaded spindle 14 in such a way that the spindle nut 18 moves to the left in FIG. 5.

The free end 24 of the tappet 26 thus becomes engaged with the lifting guide elements 20, 20' and 22 and presses against them, the rollers 42, 42' rolling on the contact surfaces 38, 38' of the first lifting guide elements 20, 20', and the roller 44 rolling on the contact surface 40 of the second lifting guide element 22. Due to the resulting wedge effect, the support part 6 is swiveled counterclockwise relative to the base part 4 in FIG. 5 until the end position of the adjustment movement illustrated in FIG. 6 is reached.

Due to its particularly flat design, the support device 2 according to the invention is especially suited for retrofitting, for example for temporarily or permanently retrofitting a nonmotorized support device, for example in the form of a slatted frame, with the functionality of an electric motor-driven adjustment, in that the support device 2 is inserted between the slatted frame and a mattress or other padding. The starting position of the adjustment movement illustrated in FIG. 1 then corresponds to a lying position, while the end position of the adjustment movement illustrated in FIG. 3 corresponds to a sitting position.

The invention claimed is:

1. Electric motor-driven adjustable support device for supporting padding of seating and/or lounging furniture, comprising:
   a base part;
   a support part that is connected to the base part so as to be swivelable about a first swivel axis;
   an electric motor driven drive device that is in operative connection with the base part and the support part in order to adjust the swiveling of the support part relative to the base part;
   the base part and the support part being designed and operatively connected to the drive device in such a way that the support part is adjustable between an unadjusted starting position, in which the support part lies flat on the base part, and an end position of the adjustment movement in which the support part is situated at an angle relative to the base part;
   the electric motor-driven drive device has a spindle drive that includes a stationary, rotatably supported threaded spindle that is in rotary drive connection with an electric motor of the drive device, and on which a spindle nut, which is movable in an axial direction of the threaded spindle and which forms the output element of the electric motor-driven drive device, is situated;
   in a region of the first swivel axis, at least one first wedge-like lifting guide element is situated at the base part, and at least one second wedge-like lifting guide element, opposite from the first wedge-like lifting guide element, is situated at the support part; and
   the lifting guide elements are situated in a movement path of a free end of a tappet, the other end of the tappet being articulatedly connected to the spindle nut and swivelable about a second swivel axis that is parallel to the first swivel axis, so that the free end of the tappet presses against the lifting guide elements in order to swivel the support part relative to the base part.

2. Support device according to claim 1, wherein: at least one lifting guide element has an expanding cross section, at least in portions, from its end facing away from the first swivel axis toward its end facing the first swivel axis.

3. Support device according to claim 1, wherein: at least one lifting guide element has a contact surface having a cross section that is arch-shaped, at least in portions, for the free end of the tappet.

4. Support device according claim 1, wherein: two first lifting guide elements, spaced apart from one another in the radial direction of the threaded spindle, are situated at the base part, the distance of the lifting guide elements from one another being selected in such a way that the tappet is guided between the lifting guide elements in the region of the end position of the adjustment movement.

5. Support device according to claim 1, wherein: at least one rotatably supported roller for resting against a contact surface of a lifting guide element is situated at the free end of the tappet.

6. Support device according to claim 5, wherein: two rollers, spaced apart from one another in the radial direction of the threaded spindle, for resting against the first lifting guide elements of the base part are situated at the free end of the tappet, and a further roller for resting against the second lifting guide element of the support part is situated between the two rollers.

\* \* \* \* \*